United States Patent
Kim et al.

(10) Patent No.: US 11,310,821 B2
(45) Date of Patent: Apr. 19, 2022

(54) METHOD FOR TRANSMITTING/RECEIVING SIGNAL BETWEEN TERMINAL AND BASE STATION IN WIRELESS COMMUNICATION SYSTEM FOR SUPPORTING UNLICENSED BAND, AND DEVICE FOR SUPPORTING SAME

(71) Applicant: LG Electronics Inc., Seoul (KR)

(72) Inventors: Seonwook Kim, Seoul (KR); Changhwan Park, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 140 days.

(21) Appl. No.: 16/637,175

(22) PCT Filed: Aug. 7, 2018

(86) PCT No.: PCT/KR2018/008947
§ 371 (c)(1),
(2) Date: Feb. 6, 2020

(87) PCT Pub. No.: WO2019/031806
PCT Pub. Date: Feb. 14, 2019

(65) Prior Publication Data
US 2020/0374910 A1 Nov. 26, 2020

Related U.S. Application Data

(60) Provisional application No. 62/542,238, filed on Aug. 7, 2017.

(51) Int. Cl.
*H04W 72/12* (2009.01)
*H04W 16/14* (2009.01)
*H04W 74/08* (2009.01)

(52) U.S. Cl.
CPC ....... *H04W 72/1289* (2013.01); *H04W 16/14* (2013.01); *H04W 74/0833* (2013.01)

(58) Field of Classification Search
CPC ............. H04W 72/1289; H04W 16/14; H04W 74/0833
See application file for complete search history.

(56) References Cited

U.S. PATENT DOCUMENTS

| 11,096,206 B2 * | 8/2021 | Aiba ..................... H04W 72/14 |
| 2011/0141998 A1 * | 6/2011 | Nishio .................. H04L 1/0072 370/329 |

(Continued)

FOREIGN PATENT DOCUMENTS

| KR | 20160059483 | 5/2016 |
| KR | 101717003 | 3/2017 |

(Continued)

OTHER PUBLICATIONS

PCT International Search Report and Written Opinion in International Application No. PCT/KR2018/008947, dated Oct. 29, 2018, 9 pages.

(Continued)

*Primary Examiner* — Brenda H Pham
(74) *Attorney, Agent, or Firm* — Fish & Richardson P.C.

(57) ABSTRACT

Disclosed are a method for transmitting/receiving a signal between a terminal and a base station in a wireless communication system for supporting an unlicensed band, and a device for supporting the same. More particularly, a terminal according to one embodiment of the present disclosure can receive a downlink signal through an unlicensed band on the basis of downlink scheduling information of a received component carrier level, or can transmit an uplink signal through the unlicensed band on the basis of uplink sched- (Continued)

uling information of a broadband channel level including a plurality of received component carriers.

13 Claims, 14 Drawing Sheets

(56) References Cited

U.S. PATENT DOCUMENTS

| | | | | |
|---|---|---|---|---|
| 2014/0115058 A1* | 4/2014 | Yin | .................... | H04W 12/062 |
| | | | | 709/204 |
| 2017/0347378 A1* | 11/2017 | Le-Ngoc | ........... | H04W 74/0833 |
| 2018/0007715 A1* | 1/2018 | Lee | ................... | H04W 74/0833 |
| 2019/0159253 A1* | 5/2019 | Koorapaty | .......... | H04W 74/006 |
| 2019/0174546 A1* | 6/2019 | Jeon | .................. | H04W 74/0816 |
| 2021/0168843 A1* | 6/2021 | Takeda | .............. | H04W 56/0045 |

FOREIGN PATENT DOCUMENTS

| | | |
|---|---|---|
| WO | WO 2017/010764 | 1/2017 |
| WO | WO 2017/030603 | 2/2017 |
| WO | WO 2017/047973 | 3/2017 |

OTHER PUBLICATIONS

EP Extended European Search Report in European Appln. No. 18843394.0, dated Feb. 5, 2021, 12 pages.
Huawei, HiSilicon, "Coexistence and channel access for NR-based unlicensed band operation," R1-1711467, 3GPP TSG RAN WG1 NR Ad Hoc Meeting, Qingdao, China, dated Jun. 27-30, 2017, 5 pages.
Huawei, HiSilicon, "NR Numerology on unlicensed bands," R1-1711465, 3GPP TSG RAN WG1 NR Ad Hoc Meeting, Qingdao, China, dated Jun. 27-30, 2017, 6 pages.
NTT Docomo, Inc., "Scheduling and HARQ for CA and DC," Rl-1708487, 3GPP TSG RAN WG1 Meeting #89, Hangzhou, P.R. China, dated May 15-19, 2017, 3 pages.
Samsung, "Channel Access for NR Unlicensed Operation," R1-1800478, 3GPP TSG-RAN WG1 Meeting #AH 1801, Vancouver, Canada, dated Jan. 22-26, 2018, 4 pages.

* cited by examiner

METHOD FOR TRANSMITTING/RECEIVING SIGNAL BETWEEN TERMINAL AND BASE STATION IN WIRELESS COMMUNICATION SYSTEM FOR SUPPORTING UNLICENSED BAND, AND DEVICE FOR SUPPORTING SAME

CROSS-REFERENCE TO RELATED APPLICATIONS

This application is a National Stage application under 35 U.S.C. § 371 of International Application No. PCT/KR2018/008947, filed on Aug. 7, 2018, which claims the benefit of U.S. Provisional Application No. 62/542,238, filed on Aug. 7, 2017. The disclosures of the prior applications are incorporated by reference in their entirety.

TECHNICAL FIELD

The following description relates to a wireless communication system, and more particularly, to a method of transmitting uplink signals from a User Equipment (UE) in a wireless communication system supporting an unlicensed band and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Task

An object of the present disclosure is to provide a method of transmitting uplink signals in a wireless communication system supporting an unlicensed band and apparatuses supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present disclosure provides a method for transmitting and receiving a signal between a user equipment and a base station in a wireless communication system supporting an unlicensed band and apparatuses for supporting the same.

In one technical aspect of the present disclosure, provided herein is a method of transmitting and receiving signals by a user equipment in a wireless communication system supportive of an unlicensed band, the method including receiving downlink scheduling information of a plurality of Component Carrier (CC) levels respectively included in one or more wideband channels or uplink scheduling information of the one or more wideband channel levels from a base station and performing a downlink signal reception through one or more CCs scheduled in the unlicensed band or an uplink signal transmission through one or more wideband channels scheduled in the unlicensed band based on the received downlink scheduling information or uplink scheduling information, wherein the performing the uplink signal transmission by the user equipment through the one or more wideband channels scheduled in the unlicensed band may include that the user equipment performs a Channel Access Procedure (CAP) for all CCs in the one or more wideband channels scheduled in the unlicensed band and that the user equipment performs the uplink signal transmission only through one or more wideband channels having succeeded in the CAP for all the included CCs among the scheduled one or more wideband channels.

According to the present disclosure, the unlicensed band may correspond to a 60-GHz band and the wideband channel may correspond to a channel having a 2-GHz bandwidth.

The wideband channel may correspond to one channel supported in a WiGig system.

The downlink scheduling information of the CC level may include a Carrier Indicator Field (CIF) corresponding to each of one or more CCs to be scheduled. Through this, the downlink scheduling information may support downlink scheduling of a CC level.

The uplink scheduling information of the wideband channel level may include a Carrier Indicator Field (CIF), Hybrid Automatic Repeat Quest (HARQ) process information, and Modulation and Coding Scheme (MC S) information shared for all CCs included in a specific wideband channel. Through this, the uplink scheduling information may support uplink scheduling of a wideband channel level.

When the user equipment performs an uplink transmission through the specific wideband channel scheduled in the unlicensed band, the user equipment may performs the uplink transmission by applying the same HARQ process information and MCS information per CC included in the specific wideband channel and a per-CC uplink resource included in the specific wideband channel may be configured at regular offset intervals.

In another technical aspect of the present disclosure, provided herein is a method of transmitting and receiving signals by a base station in a wireless communication system supportive of an unlicensed band, the method including transmitting downlink scheduling information of a plurality of Component Carrier (CC) levels respectively included in one or more wideband channels or uplink scheduling information of the one or more wideband channel levels to a user equipment and performing a downlink signal transmission through one or more CCs scheduled in the unlicensed band or an uplink signal reception through one or more wideband channels scheduled in the unlicensed band based on the transmitted downlink scheduling information or uplink scheduling information, wherein the performing the uplink signal reception by the base station through the one or more wideband channels scheduled in the unlicensed band may correspond to an operation that the base station performs the uplink signal reception only through one or more wideband channels having succeeded in a CAP of the user equipment for all included CCs among the scheduled one or more wideband channels.

In another technical aspect of the present disclosure, provided herein is a user equipment transceiving signals with a base station in a wireless communication system supportive of an unlicensed band, the user equipment including a receiver, a transmitter, and a processor configured to operate by being connected to the receiver and the transmitter, wherein the processor may be further configured to receive downlink scheduling information of a plurality of Component Carrier (CC) levels respectively included in one or more wideband channels or uplink scheduling information of the one or more wideband channel levels from a base station and perform a downlink signal reception through one or more CCs scheduled in the unlicensed band or an uplink signal transmission through one or more wideband channels scheduled in the unlicensed band based on the received downlink scheduling information or uplink scheduling information and wherein the performing the uplink signal transmission by the processor through the one or more wideband channels scheduled in the unlicensed band may include that the processor performs a Channel Access Procedure (CAP) for all CCs in the one or more wideband channels scheduled in the unlicensed band and that the processor performs the uplink signal transmission only through one or more wideband channels having succeeded in the CAP for all the included CCs among the scheduled one or more wideband channels.

In further technical aspect of the present disclosure, provided herein is a base station transceiving signals with a user equipment in a wireless communication system supportive of an unlicensed band, the base station including a receiver, a transmitter, and a processor configured to operate by being connected to the receiver and the transmitter, wherein the processor may be further configured to transmit downlink scheduling information of a plurality of Component Carrier (CC) levels respectively included in one or more wideband channels or uplink scheduling information of the one or more wideband channel levels to a user equipment and perform a downlink signal transmission through one or more CCs scheduled in the unlicensed band or an uplink signal reception through one or more wideband channels scheduled in the unlicensed band based on the transmitted downlink scheduling information or uplink scheduling information and wherein the performing the uplink signal reception by the base station through the one or more wideband channels scheduled in the unlicensed band may correspond to an operation that the base station performs the uplink signal reception only through one or more wideband channels having succeeded in a CAP of the user equipment for all included CCs among the scheduled one or more wideband channels.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, by matching a size of an uplink/downlink band scheduled for a UE and base station with a bandwidth of a channel supported by a different wireless communication system (e.g., WiGig), it is able to support the coexistence of an NR system to which the present disclosure is applicable and the different wireless communication system.

According to the present disclosure, by reducing an amount of information for scheduling of uplink transmission, a base station can provide additional information to a UE.

Additionally or alternatively, the UE is a part of an autonomous driving device that communicates with at least one of a network or another autonomous driving vehicle.

Effects obtainable from the present disclosure are non-limited by the above mentioned effect. And, other unmentioned effects can be clearly understood from the following description by those having ordinary skill in the technical field to which the present disclosure pertains. That is, unintended effects of implementing the present disclosure may also be derived by those having ordinary skill in the art from embodiments of the present disclosure.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE FOR DISCLOSURE

Figure 1:
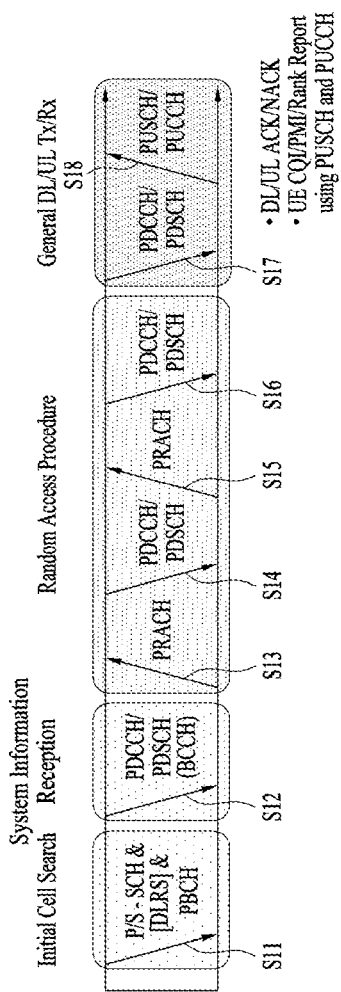
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a User Equipment (UE), a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

In order to clarify the technical features of the present disclosure, embodiments of the present disclosure are described mainly focusing on the 3GPP LTE/LTE-A system and the 3GPP NR system. It should be noted, however, that the embodiments are applicable even to the IEEE 802.16e/m system and the like.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
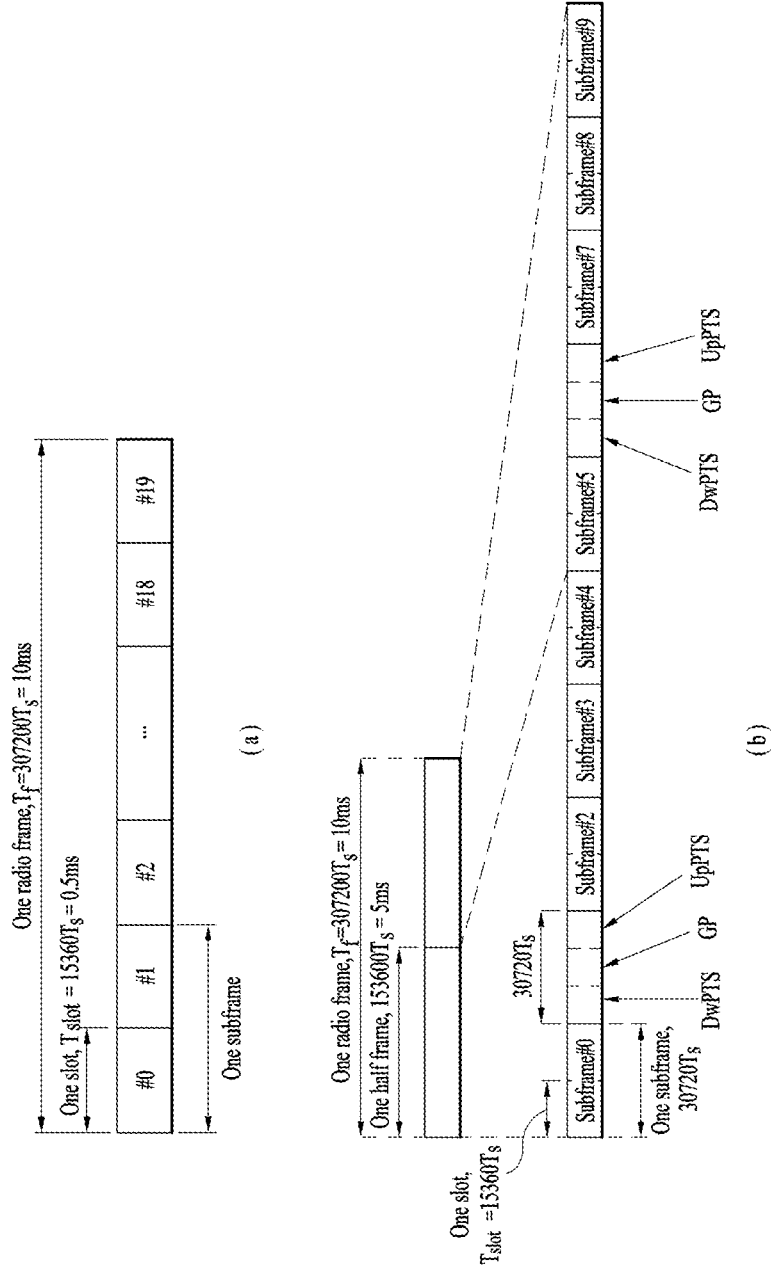
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

Figure 4:
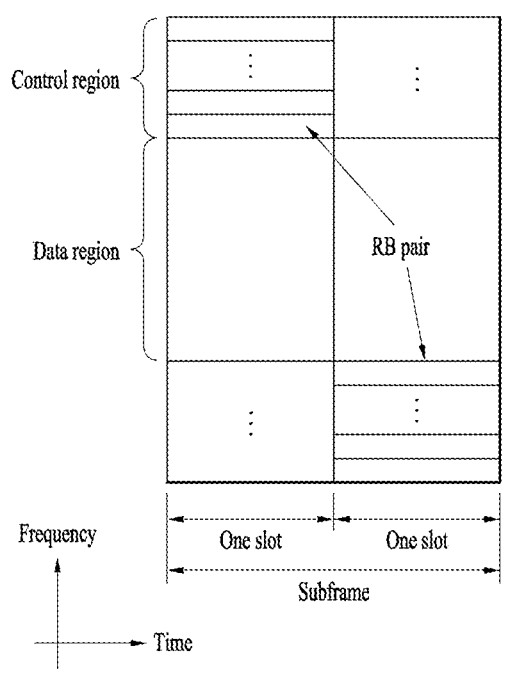
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
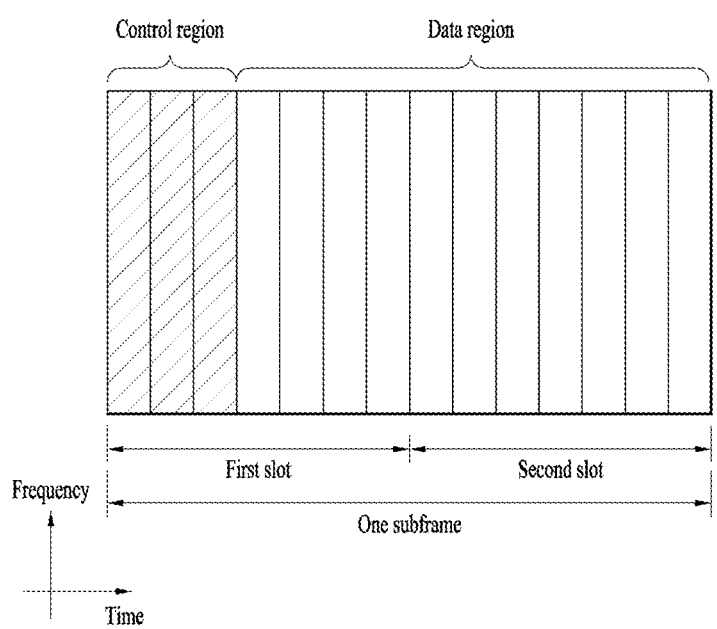
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
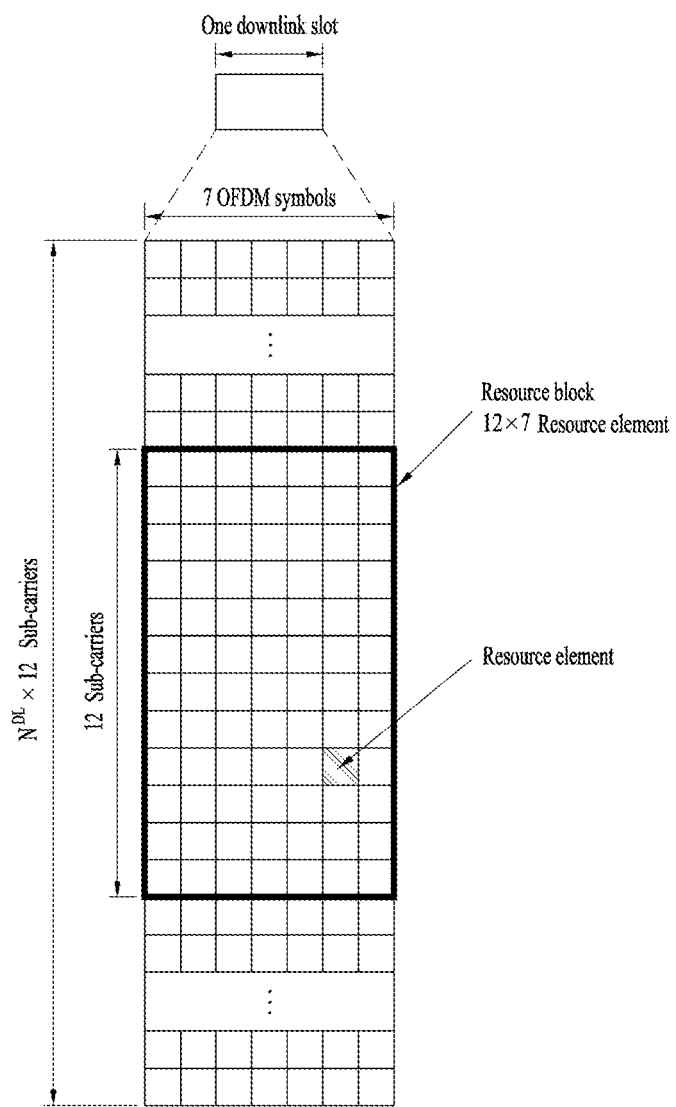
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

carried on the PDCCH is called Downlink Control Information (DCI). The DCI transports UL resource assignment information, DL resource assignment information, or UL Transmission (Tx) power control commands for a UE group.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present disclosure, the corresponding technology is referred to as the new RAT or new radio (NR) for convenience of description.

2.1. Numerologies

The NR system to which the present disclosure is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe, \mu} - 1\}$ and may also be numbered within a frame in ascending order like $n_{s,f}^\mu \in \{0, \ldots, N_{slot}^{frame, \mu} - 1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame\mu}$ | $N_{slot}^{subframe\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame\mu}$ | $N_{slot}^{subframe\mu}$ |
|---|---|---|---|
| 2 | 12 | 40 | 4 |

In the NR system to which the present disclosure can be applied, a self-contained slot structure can be applied based on the above-described slot structure.

Figure 6:
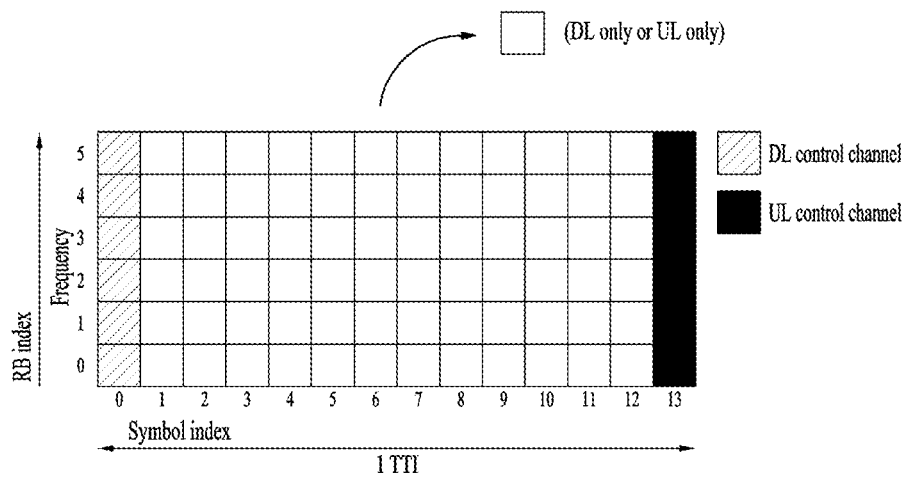
FIG. 6 is a diagram illustrating a self-contained slot structure applicable to the present disclosure.

FIG. 6 is a diagram illustrating a self-contained slot structure applicable to the present disclosure.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present disclosure may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
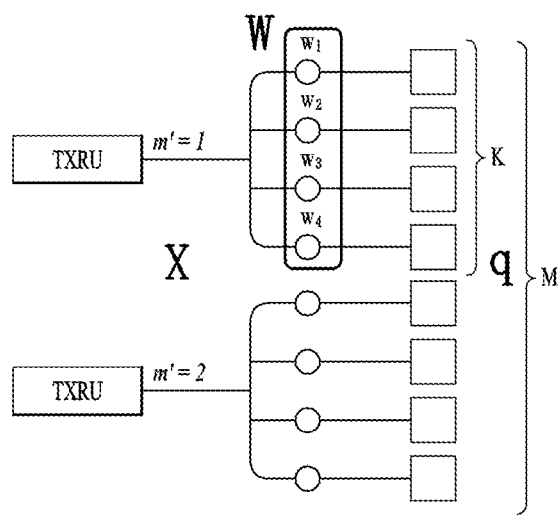
FIGS. 7 and 8 are diagrams illustrating representative connection methods for connecting TXRUs to antenna elements.
Figure 8:
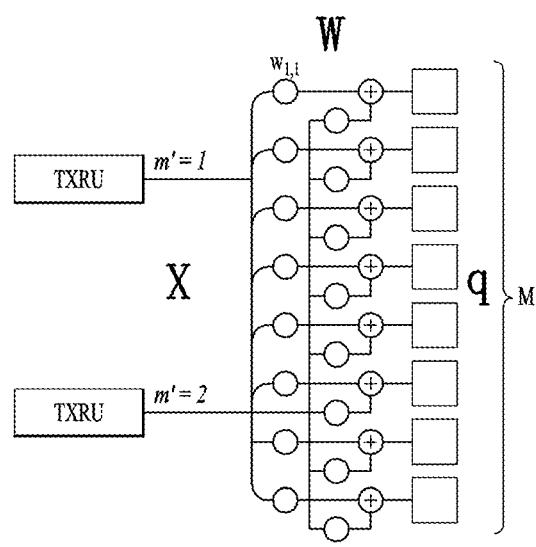

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method of connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present disclosure is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
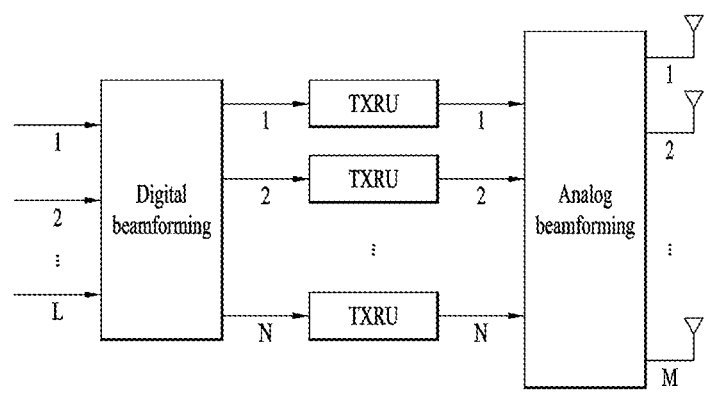
FIG. 9 is a schematic diagram illustrating a hybrid beamforming structure according to an embodiment of the present disclosure from the perspective of TXRUs and physical antennas.

FIG. 9 is a schematic diagram illustrating a hybrid beamforming structure according to an embodiment of the present disclosure from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present disclosure is applicable. Further, a method of introducing a plurality of antenna panels where independent hybrid beamforming can be applied by defining N TXRUs and M RF antennas as one antenna panel has also been considered in the NR system to which the present disclosure is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present disclosure is applicable.

Figure 10:
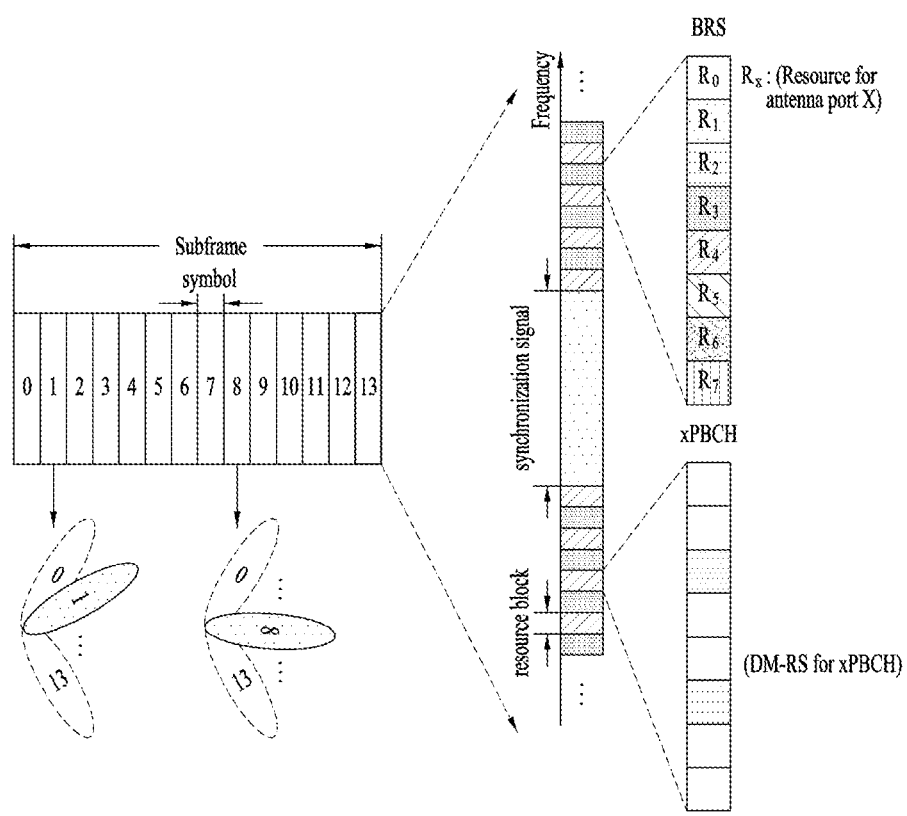
FIG. 10 is a diagram schematically illustrating the beam sweeping operation for synchronization signals and system information during a downlink (DL) transmission process according to an embodiment of the present disclosure.

FIG. 10 is a diagram schematically illustrating the beam sweeping operation for synchronization signals and system information during a downlink (DL) transmission process according to an embodiment of the present disclosure In FIG. 10, a physical resource (or channel) for transmitting system information of the NR system to which the present disclosure is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present disclosure is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

3. Licensed Assisted Access (LAA) System

Hereinafter, methods for transmitting and receiving data in a carrier aggregation environment of an NR or LTE band, which is a licensed band, and a unlicensed band will be described. In the embodiments of the present disclosure, the LAA system refers to a communication system (e.g., an LTE system or an NR system) that supports a CA situation of the licensed band and the unlicensed band. Here, as the unlicensed band, a WiFi band or a Bluetooth (BT) band may be used.

Here, LAA may refer to an LTE system or an NR system operating in an unlicensed band. LAA may also refer to a method for transmitting and receiving data in the unlicensed band in combination with the licensed band.

Figure 11:
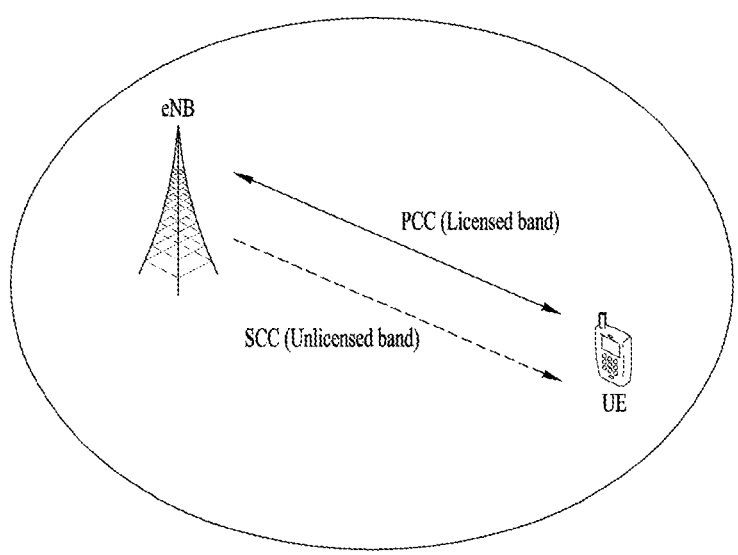
FIG. 11 is a diagram illustrating an example of a CA environment in a wireless communication system supporting an unlicensed band.

FIG. 11 is a diagram illustrating an example of a CA environment in a wireless communication system supporting an unlicensed band.

Hereinafter, for simplicity, it is assumed that the UE is configured to perform wireless communication in each of the licensed band and the unlicensed band using two component carriers (CCs). Of course, the following methods may be applied even when three or more CCs are configured for the UE.

In the embodiments of the present disclosure, it is assumed that a licensed CC (LCC) is a primary CC (which may be called a PCC or a PCell) and an unlicensed CC (UCC) is a secondary CC (which may be called a SCC or SCell). The embodiments of the present disclosure are also be applicable even to a situation in which multiple licensed bands and multiple unlicensed bands are used in a carrier aggregation manner. Further, the proposed schemes of the present disclosure are applicable not only to the 3GPP LTE system and the 3GPP NR system but also to systems having other characteristics.

FIG. 11 illustrates a case where one base station supports both the licensed band and the unlicensed band. That is, the UE may transmit/receive control information and data via a PCC, which is a licensed band, and also transmit/receive control information and data via the SCC, which is an unlicensed band. The situation shown in FIG. 11 is merely one example, and the embodiments of the present disclosure are applicable even to a CA environment where one UE accesses multiple base stations.

For example, the UE may configure a PCell with a macro base station (a Macro eNB (M-eNB) or a Macro gNB (M-gNB)), and may configure an SCell with a small base station (a Small eNB (S-eNB) or a Small gNB (S-gNB)). In this case, the macro base station and the small base station may be connected over a backhaul network.

In embodiments of the present disclosure, the unlicensed band may be operated according to a contention-based random access scheme. In this case, channel access procedures for LAA are performed as follows.

3.1. Downlink Channel Access Procedures

An eNB operating LAA Scell(s) (or an unlicensed band) shall perform the downlink channel access procedure (CAP) described below for cell(s) in which the LAA Scell(s) transmission(s) are performed.

3.1.1. Channel Access Procedure for Transmission(s) Including PDSCH/PDCCH/EPDCCH The eNB may transmit a transmission including PDSCH/PDCCH/EPDCCH on a carrier on which LAA Scell(s) transmission(s) are performed, after first sensing the channel to be idle during the slot durations of a defer duration $T_d$; and after the counter N is zero in step 4 below. The counter N is adjusted by sensing the channel for additional slot duration(s) according to the steps below:

1) set $N=N_{init}$, where $N_{init}$ is a random number uniformly distributed between 0 and $CW_p$, and go to step 4;
2) if N>0 and the eNB chooses to decrement the counter, set N=N−1;
3) sense the channel for an additional slot duration, and if the additional slot duration is idle, go to step 4; else, go to step 5;
4) if N=0, stop; else, go to step 2;
5) sense the channel until a busy slot is detected in an additional defer duration $T_d$ or all the slots of the additional defer duration $T_d$ are detected to be idle;
6) if the channel is sensed to be idle during all the slot durations of the additional defer duration $T_d$, go to step 4; else, go to step 5.

The CAP for transmission including PDSCH/PDCCH/EPDCCH of the eNB described above may be summarized as follows.

Figure 12:
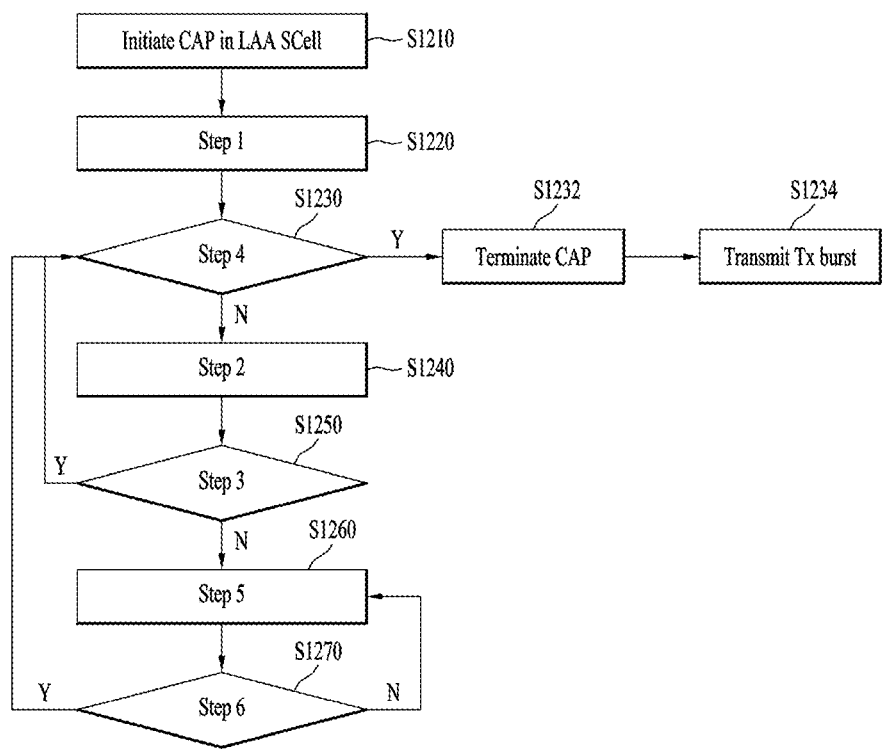
FIG. 12 is a diagram illustrating a CAP for unlicensed band transmission applicable to the present disclosure.

FIG. 12 is a diagram illustrating a CAP for unlicensed band transmission applicable to the present disclosure.

For a downlink transmission, a transmission node (e.g., an eNB) may initiate a channel access procedure (CAP) to operate in the LAA Scell(s), which are unlicensed band cells (S1210).

The eNB may randomly select a backoff counter N within the contention window CW according to step 1. At this time, N is set to an initial value $N_{init}$ (S1220). $N_{init}$ is selected as any value from among the values between 0 and $CW_p$.

Next, if the backoff counter value N is 0 in step 4 (S1230; Y), the eNB terminates the CAP (S1232). Then, the eNB may perform Tx burst transmission including PDSCH/PDCCH/EPDCCH (S1234). On the other hand, if the backoff counter value is not 0 (S1230; N), the eNB decrements the backoff counter value by 1 according to step 2 (S1240).

Then, the eNB checks whether the channel of the LAA SCell(s) is idle (S1250). If the channel is idle (S1250; Y), the base station checks whether the backoff counter value is 0 (S1230).

On the contrary, if the channel is not idle in operation S1250 (S1250; N), namely, if the channel is busy, the eNB checks whether the channel is idle during a defer duration $T_d$ (25 usec or more) longer than the slot time (e.g., 9 usec) (S1262). If the channel is idle during the defer duration (S1270; Y), the eNB may resume the CAP.

For example, when the backoff counter value $N_{init}$ is 10 and it is determined that the channel is busy after the backoff counter value is decreased to 5, the eNB senses the channel during the defer duration to determine whether the channel is idle. If the channel is idle during the defer duration, the eNB may perform the CAP again from the backoff counter value 5 (or 4 after decrementing the backoff counter value by 1) instead of setting the backoff counter value $N_{init}$.

On the other hand, if the channel is busy during the defer duration (S1270; N), the eNB re-performs operation S1260 and checks again whether the channel is idle during a new defer duration.

If an eNB has not transmitted a transmission including PDSCH/PDCCH/EPDCCH on a carrier on which LAA Scell(s) transmission(s) are performed after step 4 in the procedure above, the eNB may transmit a transmission including PDSCH/PDCCH/EPDCCH on the carrier if the following conditions are met:

the channel is sensed to be idle at least in a slot duration $T_{sl}$ when the eNB is ready to transmit PDSCH/PDCCH/EPDCCH; and the channel has been sensed to be idle during all the slot durations of a defer duration $T_d$ immediately before this transmission.

If the channel has not been sensed to be idle in a slot duration $T_{sl}$ when the eNB senses the channel after it is ready to transmit, or if the channel has been sensed to be not idle during any of the slot durations of a defer duration $T_d$ immediately before the intended transmission, the eNB proceeds to step 1 after sensing the channel to be idle during the slot durations of a defer duration $T_d$.

The defer duration $T_d$ consists of duration $T_f$ (=16 us) immediately followed by $m_p$ consecutive slot durations where each slot duration $T_{sl}$ is 9 us, and $T_f$ includes an idle slot duration $T_{sl}$ at the start of $T_f$.

A slot duration $T_{sl}$ is considered to be idle if the eNB senses the channel during the slot duration $T_{sl}$, and the power detected by the eNB for at least 4 us in the slot duration is less than energy detection threshold $X_{Thresh}$. Otherwise, the slot duration $T_{sl}$ is considered to be busy.

$CW_{min,p} \leq CW_p \leq CW_{max,p}$ is the contention window. $CW_p$ adjustment is described in detail in sub clause 3.1.3.

$CW_{min,p}$ and $CW_{max,p}$ chosen before step 1 of the procedure above.

$m_p$, $CW_{min,p}$, and $CW_{max,p}$ are based on channel access priority class associated with the eNB transmission (see Table 6 below).

$X_{Thresh}$ is adjusted as described in sub clause 3.1.4.

TABLE 6

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If the eNB transmits discovery signal transmission(s) not including PDSCH/PDCCH/EPDCCH when N>0 in the procedure above, the eNB shall not decrement the counter N during the slot duration(s) overlapping with the discovery signal transmission.

The eNB shall not perform continuous transmission on a carrier on which the LAA Scell(s) transmission(s) are performed, for a period exceeding $T_{mcot,p}$ as given in Table 6. For p=3 and p=4 in Table 6, if the absence of any other technology sharing the carrier can be guaranteed on a long term basis (e.g., by level of regulation), $T_{mcot,p}$ is set to 10 ms. Otherwise, $T_{mcot,p}$ is set to 8 ms.

3.1.2. Channel Access Procedure for Transmissions Including Discovery Signal Transmission(s) and Not Including PDSCH An eNB may transmit a transmission including discovery signal but not including PDSCH on a carrier on which LAA Scell(s) transmission(s) are performed immediately after sensing the channel to be idle for at least a sensing interval $T_{drs}$=25 μs and if the duration of the transmission is less than 1 ms. Here, $T_{drs}$ consists of a duration $T_f$(=16 us) immediately followed by one slot duration $T_{sl}$=9 us. $T_f$ includes an idle slot duration $T_{sl}$ at the start of $T_f$. The channel is considered to be idle for $T_{drs}$, if it is sensed to be idle during the slot durations of $T_{drs}$.

3.1.3. Contention Window Adjustment Procedure

If the eNB transmits transmissions including PDSCH that are associated with channel access priority class p on a carrier, the eNB maintains the contention window value $CW_p$ and adjusts $CW_p$ before step 1 of the procedure (i.e., before the CAP) described in sub clause 3.1.1 for those transmissions using the following steps:

1> for every priority class p∈{1, 2, 3, 4}, set $CW_p=CW_{min,p}$;

2> if at least Z=80% of HARQ-ACK values corresponding to PDSCH transmission(s) in reference subframe k are determined as NACK, increase $CW_p$ for every priority class p∈{1, 2, 3, 4} to the next higher allowed value and remain in step 2; otherwise, go to step 1.

In other words, if the probability that the HARQ-ACK values corresponding to the PDSCH transmission(s) in reference subframe k are determined as NACK is at least 80%, the eNB increases the CW values set for each priority class to the next higher priority class. Alternatively, the eNB maintains the CW values set for each priority class as initial values.

Here, reference subframe k is the starting subframe of the most recent transmission on the carrier made by the eNB, for which at least some HARQ-ACK feedback is expected to be available.

The eNB shall adjust the value of $CW_p$ for every priority class p∈{1, 2, 3, 4} based on a given reference subframe k only once.

If $CW_p=CW_{max,p}$, the next higher allowed value for adjusting $CW_p$ is $CW_{max,p}$.

The probability Z that the HARQ-ACK values corresponding to PDSCH transmission(s) in reference subframe k are determined as NACK may be determined in consideration of the followings:

if the eNB transmission(s) for which HARQ-ACK feedback is available start in the second slot of subframe k, HARQ-ACK values corresponding to PDSCH transmission(s) in subframe k+1 are also used in addition to the HARQ-ACK values corresponding to PDSCH transmission(s) in subframe k.

if the HARQ-ACK values correspond to PDSCH transmission(s) on an LAA SCell that are assigned by (E)PDCCH transmitted on the same LAA SCell, if no HARQ-ACK feedback is detected for a PDSCH transmission by the eNB, or if the eNB detects 'DTX', 'NACK/DTX' or 'any' state, it is counted as NACK.

if the HARQ-ACK values correspond to PDSCH transmission(s) on an LAA SCell that are assigned by (E)PDCCH transmitted on another LAA cell, if the HARQ-ACK feedback for a PDSCH transmission is detected by the eNB, 'NACK/DTX' or 'any' state is counted as NACK, and 'DTX' state is ignored.

if no HARQ-ACK feedback is detected for a PDSCH transmission by the eNB, if PUCCH format 1 with channel selection is expected to be used by the UE, 'NACK/DTX' state corresponding to 'no transmission' is counted as NACK, and 'DTX' state corresponding to 'no transmission' is ignored. Otherwise, the HARQ-ACK for the PDSCH transmission is ignored.

if a PDSCH transmission has two codewords, the HARQ-ACK value of each codeword is considered separately.

bundled HARQ-ACK across M subframes is considered as M HARQ-ACK responses.

If the eNB transmits transmissions including PDCCH/EPDCCH with DCI format 0A/0B/4A/4B and not including PDSCH that are associated with channel access priority class p on a channel starting from time $t_0$, the eNB maintains the contention window value $CW_p$ and adjusts $CW_p$ before step 1 of the procedure described in sub clause 3.1.1 for those transmissions (i.e., before performing the CAP) using the following steps:

1> for every priority class p∈{1, 2, 3, 4}, set $CW_p=CW_{min,p}$;

2> if less than 10% of the UL transport blocks scheduled by the eNB using Type 2 channel access procedure (described in sub clause 3.2.1.2) in the time interval between $t_0$ and $t_0+T_{CO}$ have been received successfully, increase $CW_p$ for every priority class p∈{1, 2, 3, 4} to the next higher allowed value and remain in step 2; otherwise, go to step 1.

Here, $T_{CO}$ is calculated as described is computed as described in subclause 3.2.1.

If the $CW_p=CW_{max,p}$ is consecutively used K times for generation of $N_{init}$, $CW_p$ is reset to $CW_{min,p}$ only for that priority class p for which $CW_p=CW_{max,p}$ consecutively used K times for generation of $N_{init}$. K is selected by the eNB from the set of values {1, 2 . . . 8} for each priority class p∈{1, 2, 3, 4}.

3.1.4. Energy Detection Threshold Adaptation Procedure

An eNB accessing a carrier on which LAA Scell(s) transmission(s) are performed, shall set the energy detection threshold ($X_{Thresh}$) to be less than or equal to the maximum energy detection threshold $X_{Thresh\_max}$.

The maximum energy detection threshold $X_{Thresh\_max}$ is determined as follows:

if the absence of any other technology sharing the carrier can be guaranteed on a long term basis (e.g., by level of regulation), then:

$$X_{Thresh\_max} = \min\left\{\begin{array}{l} T_{max} + 10\,dB, \\ X_r \end{array}\right\}$$

where $X_r$ is the energy detection threshold defined by regulatory requirements in dBm when such requirements are defined, otherwise $X_r = T_{max} + 10$ dB. $X_r = T_{max} + 10$ dB Otherwise, $$X_{Thresh\_max} = \max\left\{\min\left\{\begin{array}{l} -72 + 10 \cdot \log 10(BWMHz/20\,MHz)\,dBm, \\ T_{max}, \\ T_{max} - T_A + (P_H + 10 \cdot \log 10(BWMHz/20\,MHz) - P_{TX}) \end{array}\right\}\right\}$$

where each variable is defined as follows:
$T_A = 10$ dB for transmission(s) including PDSCH;
$T_A = 5$ dB for transmissions including discovery signal transmission(s) and not including PDSCH;
$P_H = 23$ dBm;
$P_{TX}$ the set maximum eNB output power in dBm for the carrier;
eNB uses the set maximum transmission power over a single carrier irrespective of whether single carrier or multi-carrier transmission is employed
$T_{max}$ (dBm)=10·log 10(3.16228·10$^{-8}$ (mW/MHz)·BWMHz (MHz));
BWMHz is the single carrier bandwidth in MHz.

3.1.5. Channel Access Procedure for Transmission(s) on Multiple Carriers

An eNB can access multiple carriers on which LAA Scell(s) transmission(s) are performed, according to one of the Type A or Type B procedures described below.

3.1.5.1. Type A Multi-Carrier Access Procedures

The eNB shall perform channel access on each carrier $c_i \in C$, according to the procedures described in this subclause, where C is a set of carriers on which the eNB intends to transmit, and i=0, 1, . . . q−1, and q is the number of carriers on which the eNB intends to transmit.

The counter N described in subclause 3.1.1 (i.e., the counter N considered in the CAP) is determined for each carrier $c_i$ and is denoted as $N_{c_i}$. $N_{c_i}$ is maintained according to subclause 3.1.5.1.1 or 3.1.5.1.2 below.

3.1.5.1.1. Type A1

Counter N as described in subclause 3.1.1 (i.e., the counter N considered in the CAP) is independently determined for each carrier $c_i$ and is denoted as $N_{c_i}$.

If the absence of any other technology sharing the carrier can be guaranteed on a long term basis (e.g., by level of regulation), when the eNB ceases transmission on any one carrier $c_j \in C$, for each carrier $c_i$ (where $c_i \neq c_j$), the eNB can resume decrementing $N_{c_i}$ when idle slots are detected either after waiting for a duration of $4 \cdot T_{sl}$, or after reinitialising $N_{c_i}$.

3.1.5.1.2. Type A2

Counter N is determined as described in subclause 3.1.1 for each carrier $c_j \in C$, and is denoted as $N_{c_j}$, where $c_j$ may be the carrier that has the largest $CW_p$ value. For each carrier $c_i$, $N_{c_i} = N_{c_j}$.

When the eNB ceases transmission on any one carrier for which $N_{c_i}$ is determined, the eNB shall reinitialise $N_{c_i}$ for all carriers.

3.1.5.2. Type B Multi-Carrier Access Procedure

A carrier $c_j \in C$ is selected by the eNB as follows:

the eNB selects $c_j$ by uniformly randomly choosing $c_j$ from C before each transmission on multiple carriers $c_i \in C$; or the eNB selects $c_j$ no more frequently than once every 1 second, where C is a set of carriers on which the eNB intends to transmit, i=0, 1, . . . q−1, and q is the number of carriers on which the eNB intends to transmit.

To transmit on carrier $c_j$, the eNB shall perform channel access on carrier $c_j$ according to the procedures described in subclause 3.1.1 with the modifications described in 3.1.5.2.1 or 3.1.5.2.2.

To transmit on carrier $c_i \neq c_j$, $c_i \in C$, for each carrier $c_i$, the eNB shall sense the carrier $c_i$ for at least a sensing interval $T_{mc} = 25$ us immediately before the transmitting on carrier $c_j$. And the eNB may transmit on carrier $c_i$ immediately after sensing the carrier $c_i$ to be idle for at least the sensing interval $T_{mc}$. The carrier $c_i$ is considered to be idle for $T_{mc}$ if the channel is sensed to be idle during all the time durations in which such idle sensing is performed on the carrier $c_j$ in given interval $T_{mc}$.

The eNB shall not continuously transmit on a carrier $c_i \neq c_j$ (where $c_i \in C$) for a period exceeding $T_{mcot,p}$ as given in Table 6, where the value of $T_{mcot,p}$ is determined using the channel access parameters used for carrier $c_j$.

3.1.5.2.1. Type B1

A single $CW_p$ value is maintained for the set of carriers C.

For determining $CW_p$ for channel access on carrier $c_j$, step 2 of the procedure described in sub clause 3.1.3 is modified as follows:

if at least z=80% of HARQ-ACK values corresponding to PDSCH transmission(s) in reference subframe k of all carriers $c_i \in C$ are determined as NACK, increase $CW_p$ for every priority class $p \in \{1, 2, 3, 4\}$ to the next higher allowed value; otherwise, go to step 1.

3.1.5.2.2. Type B2

A $CW_p$ value is maintained independently for each carrier $c_i \in C$ using the procedure described in subclause 3.1.3. For determining $N_{init}$ for carrier $c_j$, $CW_p$ value of carrier $c_{j1} \in C$ is used, where $c_{j1}$ is the carrier with the largest $CW_p$ among all carriers in set C.

3.2. Uplink Channel Access Procedures

A UE and an eNB scheduling UL transmission(s) for the UE shall perform the procedures described below to access the channel(s) on which the LAA Scell(s) transmission(s) are performed.

3.2.1. Channel Access Procedure for Uplink Transmission(s)

The UE can access a carrier on which LAA Scell(s) UL transmission(s) are performed according to one of Type 1 or Type 2 UL channel access procedures. Type 1 channel access procedure is described in sub clause 3.2.1.1 below. Type 2 channel access procedure is described in sub clause 3.2.1.2 below.

If an UL grant scheduling a PUSCH transmission indicates Type 1 channel access procedure, the UE shall use Type 1 channel access procedure for transmitting transmissions including the PUSCH transmission unless stated otherwise in this sub clause.

If an UL grant scheduling a PUSCH transmission indicates Type 2 channel access procedure, the UE shall use Type 2 channel access procedure for transmitting transmissions including the PUSCH transmission unless stated otherwise in this sub clause.

The UE shall use Type 1 channel access procedure for SRS (Sounding Reference Signal) transmissions not including a PUSCH transmission. UL channel access priority class p=1 is used for SRS transmissions not including a PUSCH.

TABLE 7

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE 1: For p = 3,4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2: When $T_{ulmcot,p}$ = 6 ms it may be increased to 8 ms by inserting one or more gaps. The minimum duration of a gap shall be 100 μs. The maximum duration before including any such gap shall be 6 ms.

If the 'UL configuration for LAA' field configures an 'UL offset' 1 and an 'UL duration' d for subframe n, then the UE may use channel access Type 2 for transmissions in subframes n+1+i (where i=0, 1, ... d−1) if the end of UE transmission occurs in or before subframe n+1+d−1.

If the UE scheduled to transmit transmissions including PUSCH in a set of subframes $n_0, n_1, \ldots, n_{w-1}$ using PDCCH DCI format 0B/4B, and if the UE cannot access the channel for a transmission in subframe $n_k$, the UE shall attempt to make a transmission in subframe $n_{k+1}$ according to the channel access type indicated in the DCI, where k∈{0, 1, ... w−2}, and w is the number of scheduled subframes indicated in the DCI.

If the UE is scheduled to transmit transmissions without gaps including PUSCH in a set of subframes $n_0, n_1, \ldots, n_{w-1}$ using one or more PDCCH DCI format 0A/0B/4A/4B and the UE performs a transmission in subframe $n_k$ after accessing the carrier according to one of Type 1 or Type 2 channel access procedures, the UE may continue transmission in subframes after $n_k$ where k∈{0, 1, ... w−1}.

If the beginning of UE transmission in subframe n+1 immediately follows the end of UE transmission in subframe n, the UE is not expected to be indicated with different channel access types for the transmissions in those subframes.

If the UE is scheduled to perform transmission without gaps in subframes $n_0, n_1, \ldots, n_{w-1}$ using one or more PDCCH DCI format 0A/0B/4A/4B, and if the UE has stopped transmitting during or before subframe $n_{k1}$, where k1∈{1, ... w−2}, and if the channel is sensed by the UE to be continuously idle after the UE has stopped transmitting, the UE may transmit in a later subframe $n_{k2}$, where k2∈{1, ... w−1}, using Type 2 channel access procedure. If the channel sensed by the UE is not continuously idle after the UE has stopped transmitting, the UE may transmit in a later subframe $n_{k2}$, where k2∈{1, ... w−1}, using Type 1 channel access procedure with the UL channel access priority class indicated in the DCI corresponding to subframe $n_{k2}$.

If the UE receives an UL grant and the DCI indicates a PUSCH transmission starting in subframe n using Type 1 channel access procedure, and if the UE has an ongoing Type 1 channel access procedure before subframe n:

if the UL channel access priority class value pi used for the ongoing Type 1 channel access procedure is same or larger than the UL channel access priority class value $p_2$ indicated in the DCI, the UE may transmit the PUSCH transmission in response to the UL grant by accessing the carrier by using the ongoing Type 1 channel access procedure;

if the UL channel access priority class value pi used for the ongoing Type 1 channel access procedure is smaller than the UL channel access priority class value $p_2$ indicated in the DCI, the UE shall terminate the ongoing channel access procedure.

If the UE is scheduled to transmit on a set of carriers C in subframe n, and if the UL grants scheduling PUSCH transmissions on the set of carriers C indicate Type 1 channel access procedure, and if the same 'PUSCH starting position' is indicated for all carriers in the set of carriers C, and if the carrier frequencies of the set of carriers C is a subset of one of the sets of predefined carrier frequencies, the UE may transmit on carrier $c_i$∈C using Type 2 channel access procedure.

if Type 2 channel access procedure is performed on carrier $c_i$ immediately before the UE transmission on carrier $c_j$∈C, where i≠j, and if the UE has accessed carrier $c_j$ using Type 1 channel access procedure, carrier $c_j$ is selected by the UE uniformly randomly from the set of carriers C before performing Type 1 channel access procedure on any carrier in the set of carriers C.

A base station may indicate Type 2 channel access procedure in the DCI of an UL grant scheduling transmission(s) including PUSCH on a carrier in subframe n when the base station has transmitted on the carrier according to the channel access procedure described in clause 3.1.1.

Alternatively, a base station may indicate using the 'UL Configuration for LAA' field that the UE may perform a Type 2 channel access procedure for transmissions(s) including PUSCH on a carrier in subframe n when the base station has transmitted on the carrier according to the channel access procedure described in clause 3.1.1.

Alternatively, a base station may schedule transmissions including PUSCH on a carrier in subframe n, that follows a transmission by the base station on that carrier with a duration of $T_{short\_ul}$=25 us, if subframe n occurs within the time interval starting at $t_0$ and ending at $t_0+T_{CO}$, where $T_{CO}=T_{mcot,p}+T_g$, where each variable may be defined as follows:

$t_0$ is the time instant when the base station has started transmission;

$T_{mcot,p}$ is determined by the base station as described in clause 3.1;

$T_g$ is the total duration of all gaps of duration greater than 25 us that occur between the DL transmission of the base station and UL transmissions scheduled by the base station, and between any two UL transmissions scheduled by the base station starting from $t_0$.

The base station shall schedule UL transmissions between $t_0$ and $t_0+T_{CO}$ in contiguous subframes if they can be scheduled contiguously.

For an UL transmission on a carrier that follows a transmission by the base station on that carrier within a duration of $T_{short\_ul}$=25 us, the UE may use Type 2 channel access procedure for the UL transmission.

If the base station indicates Type 2 channel access procedure for the UE in the DCI, the base station indicates the channel access priority class used to obtain access to the channel in the DCI.

3.2.1.1. Type 1 UL Channel Access Procedure

The UE may perform the transmission using Type 1 channel access procedure after sensing the channel to be idle during the slot durations of a defer duration $T_d$; and after the counter N is zero in step 4. The counter N is adjusted by sensing the channel for additional slot duration(s) according to the steps described below:

1) set $N=N_{init}$, where $N_{init}$ is a random number uniformly distributed between 0 and $CW_p$, and go to step 4;
2) if N>0 and the UE chooses to decrement the counter, set N=N−1;
3) sense the channel for an additional slot duration, and if the additional slot duration is idle, go to step 4; else, go to step 5;
4) if N=0, stop; else, go to step 2;
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5.

In brief, Type 1 UL CAP of the UE described above may be summarized as follows.

For uplink transmissions, a transmission node (e.g., a UE) may initiate a channel access procedure (CAP) to operate in the LAA Scell(s), which are unlicensed band cells (S1210).

The UE may randomly select a backoff counter N within the contention window CW according to step 1. At this time, N is set to an initial value $N_{init}$ (S1220). $N_{init}$ is selected as any value among the values between 0 and $CW_p$.

Next, if the backoff counter value N is 0 in step 4 (S1230; Y), the UE terminates the CAP (S1232). Then, the eNB may perform a Tx burst transmission (S1234). On the other hand, if the backoff counter value is not 0 (S1230; N), the UE decrements the backoff counter value by 1 according to step 2 (S1240).

Then, the UE checks whether the channel of the LAA SCell(s) is idle (S1250). If the channel is idle (S1250; Y), the base station checks whether the backoff counter value is 0 (S1230).

On the contrary, if the channel is not idle in operation S1250 (S1250; N), namely, if the channel is busy, the UE checks whether the channel is idle during a defer duration $T_d$ (25 usec or more) longer than the slot time (e.g., 9 usec) (S1262). If the channel is idle during the defer duration (S1270; Y), the UE may resume the CAP.

For example, when the backoff counter value $N_{init}$ is 10 and it is determined that the channel is busy after the backoff counter value is decreased to 5, the UE senses the channel during the defer duration to determine whether the channel is idle. If the channel is idle during the defer duration, the UE may perform the CAP again from the backoff counter value 5 (or from 4 after decrementing the backoff counter value by 1) instead of setting the backoff counter value $N_{init}$.

On the other hand, if the channel is busy during the defer duration (S1270; N), the UE re-performs operation S1260 and checks again whether the channel is idle for a new defer duration.

If the UE has not transmitted a transmission including PUSCH on a carrier on which LAA Scell(s) transmission(s) are performed after step 4 in the procedure above, the UE may transmit a transmission including PUSCH on the carrier if the following conditions are met:

the channel is sensed to be idle at least in a slot duration $T_{sl}$ when the UE is ready to transmit the transmission including PUSCH; and the channel has been sensed to be idle during all the slot durations of a defer duration $T_d$ immediately before the transmission including PUSCH.

On the other hand, if the channel has not been sensed to be idle in a slot duration $T_{sl}$ when the UE first senses the channel after it is ready to transmit, or if the channel has not been sensed to be idle during any of the slot durations of a defer duration $T_d$ immediately before the intended transmission including PUSCH, the UE proceeds to step 1 after sensing the channel to be idle during the slot durations of a defer duration $T_d$.

The defer duration $T_d$ consists of duration $T_f$(=16 us) immediately followed by $m_p$ consecutive slot durations where each slot duration $T_{sl}$ is 9 us, and $T_f$ includes an idle slot duration $T_{sl}$ at the start of $T_f$.

A slot duration $T_{sl}$ is considered to be idle if the UE senses the channel during the slot duration, and the power detected by the UE for at least 4 us within the slot duration is less than energy detection threshold $X_{Thresh}$. Otherwise, the slot duration $T_{sl}$ is considered to be busy.

$CW_{min,p} \leq CW_p \leq CW_{max,p}$ is the contention window. $CW_p$ adjustment is described in detail in sub clause 3.2.2.

$CW_{min,p}$ and $CW_{max,p}$ chosen before step 1 of the procedure above.

$m_p$, $CW_{min,p}$, and $CW_{max,p}$ are based on channel access priority class signaled to the UE (see Table 7).

$X_{Thresh}$ is adjusted as described in sub clause 3.2.3.

3.2.1.2. Type 2 UL Channel Access Procedure

If the UL uses Type 2 channel access procedure for a transmission including PUSCH, the UE may transmit the transmission including PUSCH immediately after sensing the channel to be idle for at least a sensing interval $T_{short\_ul}$=us. $T_{short\_ul}$ consists of a duration $T_f$=16 us immediately followed by one slot duration $T_{sl}$=9 us and $T_f$ includes an idle slot duration $T_{sl}$ at the start of $T_f$. The channel is considered to be idle for $T_{short\_ul}$ if it is sensed to be idle during the slot durations of $T_{short\_ul}$.

3.2.2. Contention Window Adjustment Procedure

If the UE transmits transmissions using Type 1 channel access procedure that are associated with channel access priority class p on a carrier, the UE maintains the contention window value $CW_p$ and adjusts $CW_p$ for those transmissions before step 1 of the procedure described in sub clause 3.2.1.1 (i.e., before performing the CAP), using the following procedure:

if a NDI (New Data Indicator) value for at least one HARQ process associated with HARQ_ID_ref is toggled,
  for every priority class $p \in \{1, 2, 3, 4\}$, set $CW_p = CW_{min,p}$;
  otherwise, increase $CW_p$ for every priority class $p \in \{1, 2, 3, 4\}$ to the next higher allowed value.

Here, HARQ_ID_ref is the HARQ process ID of UL-SCH in reference subframe $n_{ref}$. The reference subframe $n_{ref}$ is determined as follows:

If the UE receives a UL grant in subframe $n_g$, subframe $n_w$ is the most recent subframe before subframe $n_g$−3 in which the UE has transmitted UL-SCH using Type 1 channel access procedure:

If the UE transmits transmissions including UL-SCH without gaps starting with subframe $n_0$ and in subframes $n_0$, $n_1, \ldots, n_w$, reference subframe $n_{ref}$ is subframe $n_0$;
  otherwise, reference subframe $n_{ref}$ is subframe $n_w$.

The UE may keep the value of $CW_p$ unchanged for every priority class $p \in \{1, 2, 3, 4\}$, if the UE scheduled to transmit transmissions without gaps including PUSCH in a set of subframes $n_0, n_1, \ldots, n_{w-1}$ using Type 1 channel access procedure, and if the UE is not able to transmit any transmission including PUSCH in the set of subframes.

The UE may keep the value of $CW_p$ for every priority class $p \in \{1, 2, 3, 4\}$ the same as that for the last scheduled transmission including PUSCH using Type 1 channel access procedure, if the reference subframe for the last scheduled transmission is also $n_{ref}$.

If $CW_p = CW_{max,p}$, next higher allowed value for adjusting $CW_p$ is $CW_{max,p}$.

If the $CW_p = CW_{max,p}$ is consecutively used K times for generation of $N_{init}$, $CW_p$ is reset to $CW_{min,p}$ only for that priority class p for which $CW_p = CW_{max,p}$ is consecutively used K times for generation of $N_{init}$. K is selected by the UE from the set of values $\{1, 2 \ldots 8\}$ for each priority class $p \in \{1, 2, 3, 4\}$.

3.2.3. Energy Detection Threshold Adaptation Procedure

A UE accessing a carrier on which LAA Scell(s) transmission(s) are performed, shall set the energy detection threshold ($X_{Thresh}$) to be less than or equal to the maximum energy detection threshold $X_{Thresh\_max}$.

The maximum energy detection threshold $X_{Thresh\_max}$ is determined as follows:

if the UE is configured with higher layer parameter 'maxEnergyDetectionThreshold-r14', $X_{Thresh\_max}$ is set equal to the value signaled by the higher layer parameter;

otherwise, the UE shall determine $X'_{Thresh\_max}$ according to the procedure described in sub clause 3.2.3.1;

if the UE is configured with higher layer parameter 'energyDetectionThresholdOffset-r14', $X_{Thresh\_max}$ is set by adjusting $X'_{Thresh\_max}$ according to the offset value signaled by the higher layer parameter;

otherwise, the UE shall set to $X_{Thresh\_max} = X'_{Thresh\_max}$.

3.2.3.1. Default Maximum Energy Detection Threshold Computation Procedure

If the higher layer parameter 'absenceOfAnyOtherTechnology-r14' indicates TRUE:

$$X'_{Thresh\_max} = \min\left\{ \begin{array}{c} T_{max} + 10\,dB, \\ X_r \end{array} \right\}$$

where $X_r$ is the maximum energy detection threshold defined by regulatory requirements in dBm when such requirements are defined, otherwise $X_r = T_{max} + 10$ dB;

otherwise, $$X'_{Thresh\_max} = \max\left\{ \begin{array}{c} -72 + 10 \cdot \log10(BWMHz/20\,MHz)\,dBm, \\ \min\left\{ \begin{array}{c} T_{max}, \\ T_{max} - T_A + (P_H + 10 \cdot \log10(BWMHz/20\,MHz) - P_{TX}) \end{array} \right\} \end{array} \right\}$$

where each variable is defined as follows:

$T_A = 10$ dB $P_H = 23$ dBm;

$P_{TX}$ is the set to the value of $P_{CMAX\_H,c}$ as defined in 3GPP TS 36.101.

$T_{max}(dBm) = 10 \cdot \log 10(3.16228 \cdot 10^{-8}$ (mW/MHz)$\cdot$BWMHz (MHz))

BWMHz is the single carrier bandwidth in MHz.

3.3. Sub-Frame Structure Applicable to LAA System

Figure 13:
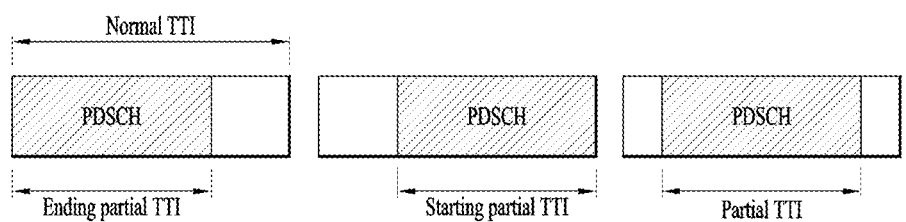
FIG. 13 is a diagram illustrating a partial TTI or a partial subframe applicable to the present disclosure.

FIG. 13 is a diagram illustrating a partial TTI or a partial subframe applicable to the present disclosure.

In the Release-13 LAA system, a partial TTI defined as DwPTS to make the most use of MCOT and support continuous transmission in transmitting a DL transmission burst is defined. The partial TTI (or partial subframe) refers to an interval in which a signal is transmitted only by a length less than the conventional TTI (e.g., 1 ms) in transmitting PDSCH.

In the present disclosure, for simplicity, a starting partial TTI or a starting partial subframe refers to a subframe in which some symbols in the head part are left blank, and an ending partial TTI or an ending partial subframe refers to a subframe in which some symbols in the tail part are left blank (whereas a complete TTI is called a normal TTI or a full TTI).

FIG. 13 is a diagram illustrating various forms of the partial TTI described above. In FIG. 13, the first block represents an ending partial TTI (or subframe), and the second block represents a starting partial TTI (or subframe). The third block of FIG. 13 represents a partial TTI (or subframe) having some symbols in the head and tail parts of a subframe left blank. Here, a time interval having no signal transmission in a normal TTI is called a transmission gap (TX gap).

While FIG. 13 is based on the DL operation, the illustrated structure also applicable to the UL operation in the same manner. For example, the partial TTI structure shown in FIG. 13 is applicable to PUCCH and/or PUSCH transmission.

4. Proposed Embodiment

Hereinafter, the configuration proposed in the present disclosure will be described in detail based on the above technical idea.

As more communication devices increasingly require greater communication capacity, efficient utilization of limited frequency bands in wireless communication systems has become increasingly important. Accordingly, a cellular communication system, such as a 3GPP LTE/NR system, supports a scheme for utilizing an unlicensed band, such as a 2.4 GHz band mainly used by an existing WiFi system, or newly spotlighted unlicensed bands, such as a 5 GHz and a 60 GHz band, for traffic offloading.

As described above, since an unlicensed band basically assumes a scheme for performing wireless transmission/reception through contention between communication nodes, each communication node performs channel sensing before transmitting a signal so as to confirm that the other communication node does not transmit a signal on the corresponding channel.

Such an operation is referred to as Listen Before Talk (LBT) or Channel Access Procedure (CAP). In particular, an operation of checking whether the other communication node performs a signal transmission is named Carrier Sensing (CS). In case of determining that the other communication node does not perform the signal transmission, it is defined that Clear Channel Assessment (CCA) is confirmed.

A base station or UE of an LTE/NR system to which the present disclosure is applicable should perform an LBT or CAP for signal transmission on an unlicensed band (hereinafter referred to as "U-band"). In addition, when a base station or UE of an LTE/NR system transmits a signal, other communication nodes, such as WiFi and the like, should also perform an LBT or CAP so as not to cause interference. For example, in the WiFi standard (801.11ac), a CCA threshold is defined as −62 dBm for a non-WiFi signal, or −82 dBm for a WiFi signal. Therefore, an STA or AP may not perform a signal transmission so as not to cause interference when a signal other than WiFi is received at a power of −62 dBm or more.

According to the present disclosure, an NR system operating on an unlicensed band (e.g., 5 GHz, 37 GHz, 60 GHz) may equalize the size of a channel/band transmitted/operated for coexistence with other systems (e.g., 802.11ac/ax/ad/ay, etc.). For example, in case of an 802.11ad/ay (hereinafter, referred to as "WiGig") system operating on 60-GHz band, one channel/band may correspond to 2 GHz. Accordingly, a base station/UE of an NR system to which the present disclosure is applicable may match 2 GHz as one carrier size.

Yet, in this case, a use of Analog-to-Digital Conversion (ADC) corresponding to a corresponding sampling rate may be necessary in terms of a UE Radio Frequency (RF), thereby significantly increasing battery consumption.

In addition, even in an NR system to which the present disclosure is applicable (from a network perspective), the maximum band that one carrier can have may be limited.

Therefore, in an NR system according to the present disclosure, several carriers may be included in a wideband and a base station/UE may support an operation of transmitting and receiving signals through all carriers in the wideband when transmitting and receiving signals. Accordingly, the UE enables implementation through one RF and a plurality of ADCs (e.g., number of carriers), thereby having a large gain in terms of battery consumption and UE implementation.

Figure 14:
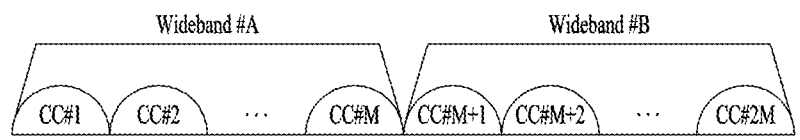
FIG. 14 is a schematic diagram of a wideband and Component Carrier (CC) configuration applicable to the present disclosure.

FIG. 14 is a diagram schematically showing wideband and Component Carrier (CC) configurations applicable to the present disclosure.

As shown in FIG. 14, each wideband (e.g., around 2 GHz) may be configured with M CCs (or may include M CCs).

In this case, an M value for the same wideband may be assumed as a different value between a base station and a UE, and the M value per wideband may differ each. For example, in case of a 240-kHz subcarrier spacing, a maximum bandwidth per carrier may be limited to 400 MHz. In this case, it may be M=5 from a base station's perspective, or it may be M=10 by recognizing 200 MHz as one carrier from a UE's perspective.

From a DL perspective, a base station performs an LBT (or CAP) per wideband, and may perform the transmission of all CCs belonging to at least one wideband if succeeding in the LBT (or CAP). At this time, such a signal transmission operation may be identically construed as the existing Carrier Aggregation (CA).

On the contrary, from a UL perspective, a UE may expect that intra-wideband carrier groups are always scheduled at one time.

Hereinafter, in the present disclosure, when one wideband includes a plurality of carriers, a multi-carrier LBT method on an unlicensed band, a UL transmission/scheduling method and the like will be described in detail.

4. 1. Multi-Carrier LBT (or Multi-Carrier CAP)

A multi-carrier LBT method proposed in the present section is identically applicable in terms of a UE as well as a base station.

4.1.1. First Multi-Carrier LBT (Individual LBT for Each of All Carriers)

A base station or UE performs CCA (or CAP or LBT) per carrier, and may perform transmission on a corresponding wideband only if succeeding in LBT (or CAP) for all carriers in a specific wideband.

In other words, a transmitting node may perform LBT (or CAP) per carrier included in one wideband for signal transmission. At this time, a signal transmission of the transmitting node may be allowed only if succeeding in the LBT (or CAP) for all carriers in one wideband.

4.1.2 Second Multi-Carrier LBT

A base station or a UE selects a carrier performing a random backoff-based LBT (or type 1 LBT) for each wideband and then performs the random backoff-based LBT (or type 1 LBT) on the carrier. If a channel is determined to be idle only for a predetermined time for another carrier in the wideband, the base station or U may perform an LBT (or a type 2 LBT, in this case, the predetermined time may include 0 μsec. Namely, it may mean no LBT.) capable of signal transmission.

For example, a base station or UE may select CC#1 of Wideband #A and CC#2M of Wideband #B in FIG. 14 as carriers to perform a type 1 LBT (or a random backoff-based LBT) of each wideband thereon. Accordingly, when the base station or UE performs a type 2 LBT on other carriers for a predetermined time right before the LBT is completed for the CC#1 and/or the CC#2M, the base station or UE may perform transmission on the wideband #A (or the wideband #B) if succeeding in the LBT of all CC#2~CC#M (or CC#M+1~CC#2M−1) as well as the CC#1 (or CC#2M). In other words, when the base station or the UE performs a type 2 LBT on other carriers for a predetermined time just before the LBT is completed for the CC#1 and/or the CC#2M and only if the base station or UE succeeds in the LBT of all CC#2~CC#M (or CC#M+1~CC#2M−1) as well as cC#1 (or CC#2M), it may attempt signal transmission on the wideband #A (or the wideband #B).

At this time, a minimum interval (or a maximum interval) (e.g., 400 MHz) (with reference to a center frequency) between carriers for performing the type 1 LBT within a different wideband thereon each may be set.

4.1.3. Third Multi-Carrier LBT

A base station or UE may select one of a plurality of carriers, perform a type 1 LBT on the selected carrier only, and perform a type 2 LBT on the rest of the carriers.

For example, if only CC#1 is configured as a carrier on which a type 1 LBT is performed for wideband #A and wideband #B in FIG. 14, a base station or UE may perform a type 2 LBT on other carriers for a predetermined time just before a time at which the LBT is completed for CC#1. Subsequently, if all CC#2~CC#2M as well as CC#1 succeeded in the LBT, the base station or UE may attempt to transmission on wideband #A and wideband #B.

If the base station or UE performs the type 2 LBT on other carriers for the predetermined time just before the time at which the LBT is completed for CC#1, it may succeed in the type 2 LBT on all carriers within the wideband in which CC#1 is not included despite failing in the LBT on some carriers within the wideband in which CC#1 is included. Yet, even if this is the case, a signal transmission on the wideband in which CC#1 is not included may not be allowed.

4.2. UL Transmission and Scheduling Method

In consideration of a fair coexistence with another system (e.g., WiGig) existing on an unlicensed band, a UE may always transmit a UL signal/channel through all CCs in a specific wideband upon UL transmission through a wideband comprised of several CCs.

In the present section, a UL transmission and scheduling method of the above case and the like will be described in detail. In addition, although the present section is described with respect to a UL transmission on an unlicensed band for clarity of description, the corresponding configuration may be extended to a configuration in which a DL signal/channel reception is always expected through all CCs within a specific wideband in terms of UE reception.

4.2.1 PUSCH Scheduling Method

If a UE is set to always perform a transmission on all CCs in a wideband in terms of UL transmission, the UE may schedule a transmission on one CC with scheduling through one UL scheduling DCI (for another CC) only. To this end, the following information included in the corresponding DCI (or some information thereof) may be shared among CCs.

HARQ process index information

Modulation and Coding Scheme (MCS) index information

Resource allocation information (frequency resource allocation information through RB indexing in the corresponding CC and/or allocation information on a time resource)

For example, in FIG. 14, it is assumed that PUSCH corresponding to an MCS index value X and an HARQ process index value Y is scheduled for resource regions of specific RB index(es) and symbol index(es) of CC#1 belonging to wideband #A. At this time, a UE may attempt PUSCH transmission by applying the corresponding scheduling information to CC#2 to CC#M in the same manner.

Or, a rule for resource allocation information between CC#K and CC#K+1 may be set. For example, if RB#N is allocated to CC#K, RB#N+offset may be allocated to CC#K+1. Here, the offset may be a preset value (e.g., offset=1), and may be set by L1 signaling (first layer signaling, e.g., DCI format) or higher layer signaling (e.g., Radio Resource Control Protocol (RRC) signaling).

On the other hand, a UE may map and transmit a Transport Block (TB) in common to all CCs in a specific wideband (Opt 1) or may map and transmit a separate TB per CC (Opt 2).

To this end, at least the following information may be indicated through UL scheduling DCI, and the corresponding information may be shared between CCs or signaled per CC according to the TB mapping method described above.

New Data Indicator (NDI)

Redundancy Version (RV)

Code Block Group (CBG) Indication

Specifically, in case of Opt 1 in which TB is mapped in common to CC, the NDI, RV and CBG indication may be applied in common to CC.

On the contrary, in case of Opt 2 in which a separate TB is mapped per CC, the NDI, RV and CBG indication may be separately signaled per CC.

In case of a Carrier Indicator Field (CIF), a small state may be required for a case of UL scheduling in comparison to DL scheduling.

For example, if a bit-width of CIF between DL scheduling DCI and UL scheduling DCI is set equal and if M=3 in the example of FIG. 14, assume a case that 2 widebands are scheduled. At this time, 6 CIF values are required from the DL scheduling perspective, but 2 CIF values may be sufficient from the UL scheduling perspective. Therefore, if CIF is configured with 3 bits, all 3 bits may be used in case of DL scheduling. Yet, in case of UL scheduling, only 1 bit is used and the remaining 2 bits may be utilized for other usages. For example of other usages, the remaining bits may be utilized for the signaling usage of the piggybacking of aperiodic CSI.

4.2.2 HARQ-ACK Bundling Method

The existing LTE system supports HARQ-ACK bundling for stable HARQ-ACK reception from a cell edge UE, or for an HARQ-ACK transmission greater than a maximum HARQ-ACK payload size supportable on a given PUCCH resource. The HARQ-ACK bundling may be performed between subframes (or slots) or between TBs in a subframe (or slot) (in a 2-codeword transmission).

In an NR system to which the present disclosure is applicable, a Code Block Group (CBG) concept is supported, and in the NR system, inter-CBG bundling may be introduced. Yet, since a channel situation may not be constant between CCs, it may not be preferable to perform inter-CC bundling.

On the other hand, it may be assumed that a channel/interference situation is similar between CCs within a specific wideband, assuming that CCs in one wideband are always transmitted simultaneously and that transmitting nodes of another system coexisting on the same unlicensed band perform transmissions by always occupying a band as much as the corresponding wideband. In this case, HARQ-ACK bundling may be applied between CCs within the specific wideband.

More typically, bundling per same CBG index is applicable between CCs within a specific wideband. For example, when M=3 and the number of CBGs per CC is 4, if a per-CBG HARQ-ACK corresponding to CC#1 is [A, N, A, A], a per-CBG HARQ-ACK corresponding to CC#2 is [A, A, A, A], and a per-CBG HARQ-ACK corresponding to CC#3 is [N, A, A, A], the bundled HARQ-ACK information to which a logical AND operation per CBG index is applied may be configured as [N, N, A, A].

4.2.3. Common Application Between CCs Within Wideband

A UE may assume that CCs belonging to a specific wideband always belong to the same Timing Advance Group (TAG). Moreover, in performing at least the following operations (or some operation thereof), the UE may assume that the corresponding operations can be commonly applied to all the CCs belonging to the specific wideband.

Power Control: A path loss estimation result performed through a specific CC is applicable to another CC. For example, parameters (e.g., P0, alpha value, etc.) for open loop power control and/or parameters for closed loop power control are commonly applicable.

Cell activation/deactivation

Radio Resource Management (RRM) measurement

Channel State Information (CSI) measurement

Figure 15:
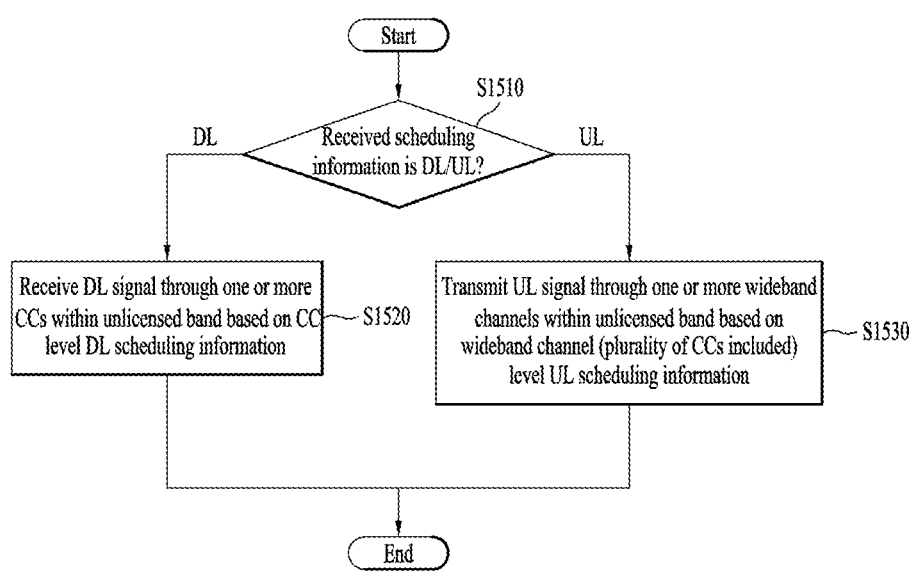
FIG. 15 is a flowchart illustrating a signal transmitting/receiving operation of a UE applicable to the present disclosure.

FIG. 15 is a flowchart illustrating a signal transmitting/receiving operation of a UE applicable to the present disclosure.

A UE receives scheduling information from a base station (S1520). At this time, the scheduling information may include downlink scheduling information or uplink scheduling information.

More specifically, the downlink scheduling information may include downlink scheduling information of a plurality of Component Carrier (CC) levels included in one or more wideband channels, and the uplink scheduling information may include uplink scheduling information of the one or more wideband channel levels.

If the received scheduling information is DL scheduling information (S1510; DL), the UE performs downlink signal reception through one or more CCs scheduled in the unlicensed band based on the received downlink scheduling information (S1520).

If the received scheduling information is UL scheduling information (S1510; UL), the UE performs uplink signal transmission on one or more wideband channels scheduled in the unlicensed band based on the received uplink scheduling information (S1530).

At this time, if the UE performs an uplink signal transmission through the one or more wideband channels scheduled in the unlicensed band, it may include: that the UE performs a Channel Access Procedure (CAP) for all CCs in the one or more wideband channels scheduled in the unlicensed band; and that the UE performs an uplink signal transmission only through one or more wideband channels having succeeded in the CAP for all the included CCs among the scheduled one or more wideband channels.

In the above configuration, the unlicensed band may correspond to a 60-GHz band, and the wideband channel may correspond to a channel having a 2-GHz bandwidth.

For one specific example, the wideband channel may correspond to one channel supported by a WiGig system. In other words, the wideband channel may correspond to one channel supported by IEEE 802.11ad/ay.

In addition, in the present disclosure, the downlink scheduling information of the CC level may include a Carrier Indicator Field (CIF) corresponding to each of the scheduled one or more CCs.

In addition, the uplink scheduling information of the wideband channel level may include a Carrier Indicator Field (CIF), Hybrid Automatic Repeat reQuest (HARQ) process information, and Modulation and Coding Scheme (MCS) information shared for all CCs included in a specific wideband channel.

Here, when the UE performs uplink transmission through the specific wideband channel scheduled in the unlicensed band, the UE may perform uplink transmission by applying the same HARQ process information and the same MCS information for each CC included in the specific wideband channel. At this time, an uplink resource for each CC included in the specific wideband channel may be configured at regular offset intervals.

It should be apparent that examples of the proposed scheme described above may also be included in one of the implementation methods of the present disclosure, and thus may be considered as some sort of proposed schemes. Further, although the proposed schemes described above may be implemented independently, they may be implemented in a combination (or merge) form of some proposed schemes. A rule may be defined in a manner that a base station informs a UE of information indicating whether the proposed methods are applied (or information on the rules of the proposed methods) through a predefined signal (e.g., a physical layer signal or a higher layer signal).

5. Device Configuration

Figure 16:
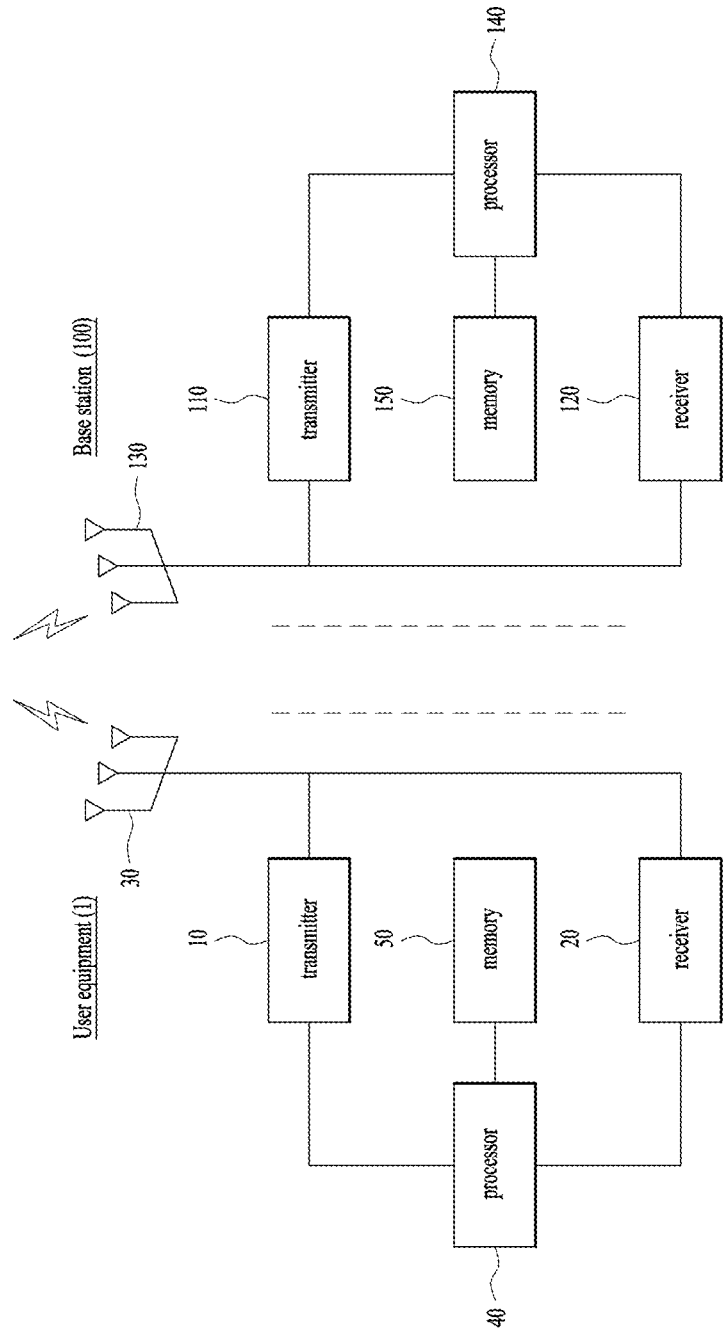
FIG. 16 is a diagram illustrating a configuration of a UE and a base station in which the proposed embodiments may be implemented.

FIG. 16 is a diagram illustrating configurations of a UE and a base station capable of being implemented by the embodiments proposed in the present disclosure. The UE and the base station shown in FIG. 16 operate to implement the above-described embodiments of the method of uplink signal transmission/reception between the UE and the base station.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 configured as described above receives downlink scheduling information of a plurality of Component Carrier (CC) levels respectively included in one or more wideband channels or uplink scheduling information of the one or more wideband channel levels from the base station 100 through the receiver 20. Then, the UE 1 is connected to the transmitter 10 and the receiver 20 to perform a downlink signal reception through one or more CCs scheduled in the unlicensed band or an uplink signal transmission through one or more wideband channels scheduled in the unlicensed band based on the received downlink scheduling information or uplink scheduling information, through the processor 40 controlling the transmitter 10 and the receiver 20. In this case, the UE performs the uplink signal transmission through one or more wideband channels scheduled in the unlicensed band, which may include: that the UE performs a Channel Access Procedure (CAP) for all CCs in the one or more wideband channels scheduled in the unlicensed band; and that the UE performs an uplink signal transmission only through one or more wideband channels having succeeded in the CAP for all the included CCs among the scheduled one or more wideband channels.

In response, the base station 100 transmits the downlink scheduling information of a plurality of Component Carrier (CC) levels respectively included in the one or more wideband channels or the uplink scheduling information of the one or more wideband channel levels to the UE 1 through the transmitter 10. Then, the base station 100 is connected to the transmitter 110 and the receiver 120 to perform a downlink signal transmission through one or more CCs scheduled in the unlicensed band or an uplink signal reception through the one or more wideband channels scheduled in the unlicensed band based on the transmitted downlink scheduling information or uplink scheduling information, through the processor 140 controlling the transmitter 110 and the receiver 120. Here, the base station performs the uplink signal reception through the one or more wideband channels scheduled in the unlicensed band, which may correspond to an operation that the base station performs the uplink signal reception only through one or more wideband channels having succeeded in the CAP of the UE for all the included CCs among the scheduled one or more wideband channels.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 16 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.)

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of transmitting and receiving signals by a user equipment (UE) in a wireless communication system supportive of an unlicensed band, the method comprising:
receiving, from a base station, or uplink scheduling information of one or more wideband channels; and
performing an uplink signal transmission through one or more wideband channels scheduled in the unlicensed band based on the received uplink scheduling information,
wherein the performing the uplink signal transmission by the UE through the one or more wideband channels scheduled in the unlicensed band includes that the UE performs a Channel Access Procedure (CAP) for all Component Carriers (CCs) in the one or more wideband channels scheduled in the unlicensed band and that the UE performs the uplink signal transmission only through one or more wideband channels having succeeded in the CAP for all the included CCs among the scheduled one or more wideband channels,
wherein the uplink scheduling information of the one or more wideband channels comprises a Carrier Indicator Field (CIF), Hybrid Automatic Repeat Quest (HARQ) process information, and Modulation and Coding Scheme (MCS) information shared for all CCs included in a specific wideband channel, and
wherein based on the UE performing an uplink transmission through the specific wideband channel scheduled in the unlicensed band, the UE performs the uplink transmission by applying the same HARQ process information and MCS information per CC included in the specific wideband channel.

2. The method of claim 1, wherein the unlicensed band corresponds to a 60-GHz band and wherein the wideband channel corresponds to a channel having a 2-GHz bandwidth.

3. The method of claim 2, wherein the wideband channel corresponds to one channel supported in a WiGig system.

4. The method of claim 1, wherein based on the UE performing an uplink transmission through the specific wideband channel scheduled in the unlicensed band, uplink resources are allocated in the each of CCs and the same interval presents each of uplink resources.

5. The method of claim 1, wherein the uplink scheduling information is received through downlink control information (DCI).

6. The method of claim 1, wherein all CCs included in a specific wideband channel belong to a same timing advance group (TAG).

7. A user equipment (UE) configured to communicate with a base station in a wireless communication system supportive of an unlicensed band, the UE comprising:
a receiver;
a transmitter;
a processor connected to the receiver and the transmitter; and
a computer-readable storage medium storing instructions that, based on being executed by the processor, control the UE to perform operations comprising:
receiving, from a base station, uplink scheduling information of one or more wideband channels; and
performing an uplink signal transmission through one or more wideband channels scheduled in the unlicensed band based on the received uplink scheduling information,
wherein the performing the uplink signal transmission through the one or more wideband channels scheduled in the unlicensed band includes performing a Channel Access Procedure (CAP) for all Component Carriers (CCs) in the one or more wideband channels scheduled in the unlicensed band and performing the uplink signal transmission only through one or more wideband channels having succeeded in the CAP for all the included CCs among the scheduled one or more wideband channel,
wherein the uplink scheduling information of the one or more wideband channels comprises a Carrier Indicator Field (CIF), Hybrid Automatic Repeat Quest (HARQ) process information, and Modulation and Coding Scheme (MCS) information shared for all CCs included in a specific wideband channel, and
wherein based on the UE performing an uplink signal transmission through the specific wideband channel scheduled in the unlicensed band, the UE performs the uplink signal transmission by applying the same HARQ process information and MCS information per CC included in the specific wideband channel.

8. The UE of claim 7, wherein the unlicensed band corresponds to a 60-GHz band and wherein the wideband channel corresponds to a channel having a 2-GHz bandwidth.

9. The UE of claim 8, wherein the wideband channel corresponds to one channel supported in a WiGig system.

10. The UE of claim 7, wherein based on that the UE performs an uplink transmission through the specific wideband channel scheduled in the unlicensed band, uplink resources are allocated in the each of CCs and the same interval presents each of uplink resources.

11. The UE of claim 7, wherein the uplink scheduling information is received through downlink control information (DCI).

12. The UE of claim 7, wherein all CCs included in a specific wideband channel belong to a same timing advance group (TAG).

13. A base station configured to communicate with a user equipment (UE) in a wireless communication system supportive of an unlicensed band, the base station comprising:
  a receiver;
  a transmitter;
  a processor connected to the receiver and the transmitter; and
  a computer-readable storage medium storing instructions that, based on being executed by the processor, control the UE to perform operations comprising:
    transmitting, to a user equipment (UE), uplink scheduling information of one or more wideband channels, and
    performing an uplink signal reception through one or more wideband channels scheduled in the unlicensed band based on the transmitted uplink scheduling information,
  wherein the performing the uplink signal reception by the base station through the one or more wideband channels scheduled in the unlicensed band includes performing the uplink signal reception only through one or more wideband channels having succeeded in a CAP of the UE for all included Component Carriers (CCs) among the scheduled one or more wideband channels,
  wherein the uplink scheduling information of the one or more wideband channels comprises a Carrier Indicator Field (CIF), Hybrid Automatic Repeat Quest (HARQ) process information, and Modulation and Coding Scheme (MCS) information shared for all CCs included in a specific wideband channel, and
  wherein based on the base station performing the uplink signal reception through the specific wideband channel scheduled in the unlicensed band, the base station performs the uplink signal reception to which the same HARQ process information and MCS information are applied per CC included in the specific wideband channel.

* * * * *